(12) United States Patent
Venkatraman et al.

(10) Patent No.: US 8,332,137 B2
(45) Date of Patent: Dec. 11, 2012

(54) NAVIGATION SYSTEM WITH DYNAMICALLY CALIBRATED PRESSURE SENSOR

(75) Inventors: SaiPradeep Venkatraman, Santa Clara, CA (US); Quanwei Liu, Santa Clara, CA (US); Lionel Garin, Palo Alto, CA (US)

(73) Assignee: Qualcomm Incorporated, San Diego, CA (US)

( * ) Notice: Subject to any disclaimer, the term of this patent is extended or adjusted under 35 U.S.C. 154(b) by 1257 days.

(21) Appl. No.: 11/950,207

(22) Filed: Dec. 4, 2007

(65) Prior Publication Data

US 2009/0143983 A1 Jun. 4, 2009

(51) Int. Cl.
*G01C 21/00* (2006.01)

(52) U.S. Cl. ............... 701/408; 701/3; 701/7; 701/495; 701/507; 342/120; 342/121; 342/165; 342/174; 342/357.2

(58) Field of Classification Search .................. 701/3, 7, 701/207, 213, 214; 342/120, 121, 174, 450, 342/357.25
See application file for complete search history.

(56) References Cited

U.S. PATENT DOCUMENTS

| | | | |
|---|---|---|---|
| 5,210,540 A | 5/1993 | Masumoto | |
| 5,265,025 A * | 11/1993 | Hirata | 701/469 |
| 5,646,857 A * | 7/1997 | McBurney et al. | 701/475 |
| 6,216,064 B1 | 4/2001 | Johnson et al. | |
| 6,882,308 B2 | 4/2005 | Farine et al. | |
| 6,970,795 B1 * | 11/2005 | Burgett et al. | 702/85 |
| 7,142,152 B2 | 11/2006 | Burgett et al. | |
| 2004/0196176 A1 * | 10/2004 | Burgett et al. | 342/120 |
| 2006/0178790 A1 * | 8/2006 | Shigemi et al. | 701/7 |
| 2009/0143983 A1 * | 6/2009 | Venkatraman et al. | 701/214 |

FOREIGN PATENT DOCUMENTS

| | | |
|---|---|---|
| DE | 10044393 A1 | 4/2002 |
| EP | 0534892 A1 | 3/1993 |

OTHER PUBLICATIONS

European Search Report—EP08170746, Place of search: The Hague, Date of Mailing Oct. 15, 2009.
Georg J. Mayr, Johannes Vergeiner, Alexander Gohm: "An Automobile Platform for the Measurement of Foehn and Gap Flows" Journal of Atmospheric and Oceanic Technology, vol. 19, No. 10, 2002, pp. 1545-1556, XP002529580, * p. 1546, cols. 1,2—p. 1548, cols. 1,2; figures 2,3 * p. 1549, cols. 1,2—p. 1555, cols. 1,2; figure 4.
Jani Kappi and Kimmo Alanen, "Pressure Altitude Enhanced AGNSS Hybrid Receiver for a Mobile Terminal," Proceedings of Ion GNSS 2005, Sep. 13, 2005, pp. 1991-1997, XP002521800, * figures 2-4,6,9 * pp. 1992-1993, section "Algorithm Approach" p. 1994, section "Performance Evaluation".
Lionel J. Garin et al, "Enhancing Altitude Accuracy in Automotive Navigation Using MEMS Barometric Sensor with GPS," Proceedings of the 2008 National Technical Meeting of the Institute of Navigation, Jan. 28, 2008, pp. 670-679, XP002521801, San Diego, CA, USA.

\* cited by examiner

*Primary Examiner* — Redhwan k Mawari (57) ABSTRACT

A navigation system includes a pressure sensor, a calibration module in communication with the pressure sensor, and an altitude module in communication with the calibration module. The calibration module is configured to determine a dynamic pressure proportionality coefficient based at least in part on a static pressure proportionality coefficient, a measured pressure value from the pressure sensor, and a velocity value. The altitude module is configured to calculate a sensor-based altitude value based at least in part on the determined dynamic pressure proportionality coefficient.

5 Claims, 5 Drawing Sheets

NAVIGATION SYSTEM WITH DYNAMICALLY CALIBRATED PRESSURE SENSOR

FIELD

The subject of the disclosure relates generally to navigation systems with enhanced vertical accuracy. More specifically, the embodiments of the present disclosure relate to systems and methods for using sensors to improve navigation system accuracy and precision. Still more particularly, embodiments of the present disclosure employ techniques to estimate dynamic pressure and static pressure to calibrate a pressure sensor in a navigation system to obtain more accurate and reliable location measurements.

BACKGROUND

Navigation systems have become integral components in today's automobile and transportation industries. Among other things, these systems can be used to provide a map of a current position, provide detailed driving instructions, identify nearby restaurants, and identify nearby points of interest. State of the art navigations systems sometimes combine Global Navigation Satellite System (GNSS), including Global Positioning System (GPS), Galileo, Compass and/or GLONASS techniques, with map matching techniques to achieve exceptional horizontal accuracy (i.e., current position with respect to longitude and latitude coordinates). Unfortunately, the inventors have recognized that presently available navigation systems at times encounter difficulties in providing accurate or reliable vertical accuracy (i.e., altitude).

The inventors have perceived that vertical accuracy in navigation systems is limited in part due to poor geometric dilution of precision (GDOP), which is caused when the satellites used to obtain GPS coordinates are clustered too close together. The inventors have further perceived that vertical accuracy is limited in urban or other areas in which direct reception of satellite transmissions becomes blocked. Buildings and other tall structures in urban areas can also cause an effect known as multipath, which further reduces the accuracy of navigation systems. Multipath can refer to the reception of a non-line of sight (i.e., reflected/refracted) signal from a satellite transmitter. Because the non-line of sight signal is reflected or refracted, it takes longer to reach the navigation system than would a signal received in the line of sight. As a result, the navigation system calculates (based on the fact that the transmission time of a signal is directly correlated to the distance traveled by the signal) that the vehicle is at a lower altitude (i.e., farther away from the satellite) than it really is.

The inventors have recognized that the vertical accuracy of a navigation system can be extremely important when a user is traveling on multi-level roads in which a first road is directly on top of a second road. In such multi-level roads, the lack of vertical accuracy makes it difficult for navigation systems to accurately distinguish between exits on the upper road and exits on the lower road. In multi-level roads with two-way traffic on each level, the lack of vertical accuracy also makes it difficult for navigation systems to distinguish between northbound/southbound (or eastbound/westbound) exits on the same level. As a result, timely notification of approaching exits is not provided to the user. Similar problems occur in 'clover leaf' freeway configurations in which two roads separate in almost parallel directions, but with different slopes.

Thus, the inventors have perceived a need for a navigation system which is capable of distinguishing between upper and lower levels of a multi-level road such that more accurate driving directions can be provided. Further, the inventors perceive a need for a navigation system which can provide accurate vertical measurements in an urban or other area in which the reception of multipath is problematic.

SUMMARY

An exemplary navigation system is provided. The navigation system includes a pressure sensor, a calibration module in communication with the pressure sensor, and an altitude module in communication with the calibration module. The calibration module is configured to determine a dynamic pressure proportionality coefficient based at least in part on a static pressure proportionality coefficient, a measured pressure value from the pressure sensor, and a velocity value. The altitude module is configured to calculate a sensor-based altitude value based at least in part on the determined dynamic pressure proportionality coefficient.

An exemplary method for calibrating a pressure sensor of a navigation system is provided. A static pressure value is determined based at least in part on a first pressure measurement from the pressure sensor, wherein the first pressure measurement is taken during a static condition. A zero slope condition based on road slope information is identified. A dynamic pressure proportionality coefficient is determined based at least in part on the determined static pressure, a second pressure measurement taken by the pressure sensor during a non-static condition, and a velocity value.

Another exemplary method for calibrating a pressure sensor of a navigation system includes determining a static pressure proportionality coefficient based at least in part on a measured pressure value and a received altitude value. A dynamic pressure proportionality coefficient is determined based at least in part on the determined static pressure proportionality coefficient and a received velocity value.

Another exemplary method for calibrating a pressure sensor of a navigation system includes determining a static pressure proportionality coefficient based at least in part on a measured pressure value. An expected altitude difference over a time interval is also determined. A dynamic pressure proportionality coefficient is determined based at least in part on the static pressure proportionality coefficient and the expected altitude difference.

Yet another exemplary method for calibrating a pressure sensor of a navigation system includes determining a pressure change threshold based at least in part on a first dynamic pressure proportionality coefficient corresponding to a first environmental state. A change in measured pressure is determined based at least in part on a first measured pressure value and a second measured pressure value. A determination is made regarding whether the change in measured pressure exceeds the pressure change threshold. If the pressure change threshold is exceeded, a second dynamic pressure proportionality coefficient corresponding to a second environmental state is calculated.

Other features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

Described herein is a method, system, and computer-readable medium for increasing the accuracy of location measurements by a receiver using a global navigation satellite system (GNSS). In one embodiment, a pressure sensor is incorporated into the navigation system and used to measure barometric pressure. The pressure sensor can be calibrated by determining a dynamic pressure proportionality coefficient and a static pressure proportionality coefficient. Once calibrated, a pressure equation can be used to convert the measured pressure into altitude. The altitude obtained from the pressure sensor measurement can be combined with an altitude measurement obtained from the GNSS through a process referred to as filtering. The filtering process can be used to provide an optimized altitude value based on noise characteristics of the pressure-based altitude and GNSS-based altitude.

Figure 1:
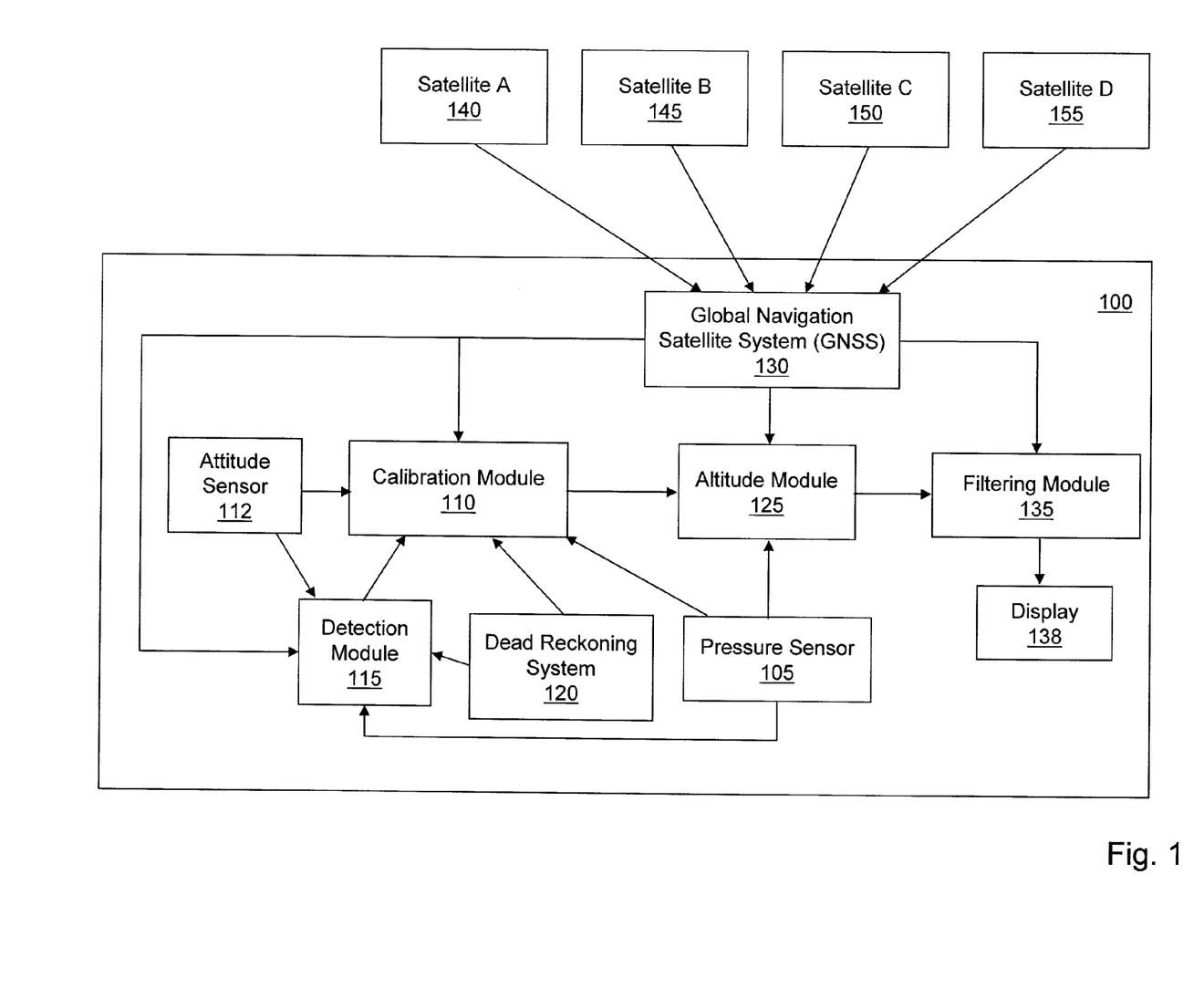
FIG. 1 is a block diagram illustrating a navigation system with a pressure sensor in accordance with an exemplary embodiment.

FIG. 1 is a block diagram illustrating a navigation system 100 with a pressure sensor 105 in accordance with an exemplary embodiment. As will be true for most of the exemplary system embodiments, navigation system 100 is typically a microprocessor or microcontroller-based system, which may include one or more such microprocessors and microcontrollers. The system 100 can include memory having executable code embedded therein. Further the executable code can be provided to system 100 by means of a machine readable medium. System 100 further includes pressure sensor 105, a calibration module 110, an attitude sensor 112, a detection module 115, a dead reckoning system 120, an altitude module 125, a GNSS chipset 130, a filtering module 135, and a display 138. A "chipset" as used in this disclosure means one or more integrated circuits. In alternative embodiments, navigation system 100 may include additional, fewer, or different components. As used herein, the term 'module' can refer to any hardware and/or software which are configured to perform one or more tasks. Pressure sensor 105 can be a Bosch Sensortec pressure sensor manufactured by Bosch (headquartered near Reutlingen, Germany). Alternatively, any other type of micro electromechanical sensor (MEMS) configured to measure pressure may be used. Pressure sensor 105 can also have temperature compensation capabilities and low noise characteristics.

In an exemplary embodiment, GNSS chipset 130 can receive signals through one or more antennae (not shown) from a satellite A 140, a satellite B 145, a satellite C 150, a satellite D 155, and so on. The number of satellites being received by GNSS chipset 130 can depend on the position of navigation system 100, the time of day, the number of obstructions positioned proximate to navigation system 100, etc. Based on the signals received from the satellites, GNSS chipset 130 can use trilateration as known to those of skill in the art to determine a horizontal position and altitude of navigation system 100. Alternatively, GNSS chipset 130 can use any other method(s) to determine the horizontal position and/or altitude. The altitude value obtained through GNSS chipset 130 can be provided to filtering module 135.

Pressure sensor 105 can be used to measure pressure. The measured pressure can be a total pressure value which may include both a dynamic pressure component and a static pressure component. Static pressure can refer to the air pressure exerted on pressure sensor 105 while pressure sensor 105 is in a stationary state with no extraneous pressure altering effects. Dynamic pressure can refer to the component of the total measured pressure which results from motion of pressure sensor 105 (for example, via a vehicle in which navigation system 100 is mounted) and other extraneous circumstances. Examples of extraneous circumstances which affect dynamic pressure can include whether a vehicle window is open or closed, whether a vehicle moon roof or sun roof is open or closed, whether a vehicle heater is on or off, whether a vehicle air conditioner is on or off, etc. The relationship between total (measured) pressure ($P_{Total}$), dynamic pressure ($P_{Dynamic}$), and static pressure ($P_{static}$) is illustrated with reference to Equation 1 below.

$$P_{Total} = P_{Dynamic} + P_{Static} \quad \text{Equation 1}$$

The relationship between static pressure and absolute altitude can be represented in terms of a static pressure proportionality coefficient ($P_o$). The static pressure proportionality coefficient can depend on the ambient temperature, the weather conditions, etc. The relationship between the static pressure ($P_{static}$) and the static pressure proportionality coefficient ($P_o$) is illustrated with reference to Equation 2, in which $T_o$ is the temperature, $T_{grad}$ is a temperature gradient, $\alpha$ is an exponential factor, and ALT is the true altitude at which pressure sensor 105 is positioned. Components of the exponential factor $\alpha$ are illustrated with reference to Equation 3, in which $g_o$ is a gravitational constant, M is a molar mass of air, and R is a universal gas constant for air. In an exemplary embodiment, $T_{grad} = -0.0065°$ Celsius (C.)/meter (m), R=8314 (Newton (N)*m)/(Kmol*Kelvin), $g_o$=9.80655 m/second squared ($s^2$), and M=28.964 grams(g)/mole. Small changes in the temperature $T_o$ have a relatively small affect on the bracketed portion of Equation 2. As such, $T_o$ may be represented as a constant of approximately 288 Kelvin. Alternatively, $T_o$ can be a measured temperature value.

$$P_{Static} = P_o \left[ \frac{T_o}{T_o + (T_{grad} * ALT)} \right]^\alpha \quad \text{Equation 2}$$

$$\alpha = \frac{g_o * M}{R * T_{grad}} \quad \text{Equation 3}$$

The relationships as shown in Equations 2 and 3 are models of the relationship between static pressure and absolute altitude. As will be clear to a person of skill in the art, the relationship can be modeled in a variety of ways that go beyond the use of a proportionality coefficient. In such cases, it will be useful to determine some information about the model used to describe the relationship between static pressure and absolute altitude, depending on the type of model used. To facilitate explanation, however, exemplary embodiments will be illustrated using the idea of a proportionality coefficient.

The dynamic pressure can be represented in part by a dynamic pressure proportionality coefficient (K). As with the static pressure, the dynamic pressure can be modeled in a variety of ways that go beyond the use of a proportionality coefficient and, depending on the type of model used, the determination of some information regarding the model will be useful. Once again, however, exemplary embodiments will be illustrated using the idea of a proportionality coefficient.

The dynamic pressure proportionality coefficient can depend on a plurality of extraneous factors which affect the environment (e.g., vehicle interior) in which pressure sensor 105 is located. As described above, these extraneous factors can include whether the vehicle windows are open, whether the vehicle air conditioning is on, etc. Depending on the mathematical model used to represent $P_{Static}$, the extraneous factors may also affect the static pressure proportionality coefficient ($P_o$). Alternatively, the pressure relationship may be modeled such that extraneous vehicle-related factors only affect K. The dynamic pressure is also directly correlated to a velocity (v) of pressure sensor 105. The velocity (v) of pressure sensor can be induced by motion of a vehicle in which pressure 105 is mounted and can be relative to ambient air in the environment in which the vehicle is moving. The relationship between dynamic pressure ($P_{Dynamic}$), velocity (v), and the dynamic pressure proportionality coefficient (K) is illustrated with reference to Equation 4 below. Using Equations 1, 2, and 4, it follows that $P_{Total}$ can be represented as illustrated with reference to Equation 5 (i.e., pressure equation) below.

$$P_{Dynamic} = K*v^2 \qquad \text{Equation 4}$$

$$P_{Total} = K*v^2 + P_o \left[ \frac{T_o}{T_o + T_{grad}*ALT} \right]^\alpha \qquad \text{Equation 5}$$

Calibration of pressure sensor 105 can refer to a process in which the dynamic pressure proportionality coefficient (K) and the static pressure proportionality coefficient ($P_o$) are estimated such that Equation 5 can be used to determine the altitude (ALT). The calibration can be performed by calibration module 110. Various methods for calibrating pressure sensor 105 are described in detail with reference to FIGS. 2-4. In an exemplary embodiment, calibration module 110 may receive information from pressure sensor 105, GNSS chipset 130, dead reckoning system 120, attitude sensor 112, and/or detection module 115. The received information can be used to estimate and/or update the dynamic pressure proportionality coefficient and the static pressure proportionality coefficient. For example, GNSS chipset 130 and/or dead reckoning system 120 may provide GNSS-based altitude values and velocity values to calibration module 110. Dead reckoning system 120 and/or attitude sensor 112 may provide calibration module 110 with information regarding road slope. Detection module 115 may be used to detect environmental changes, and can provide information regarding the changes to calibration module 110. If the environmental changes are significant, calibration module 110 may recalibrate pressure sensor 105 to ensure that the sensor-based altitude remains accurate.

Once pressure sensor 105 is calibrated, the estimated values for the dynamic pressure proportionality coefficient and the static pressure proportionality coefficient can be provided to altitude module 125. Altitude module 125 can be used to determine the sensor-based altitude based on the estimated coefficient values and the measured pressure value provided by pressure sensor 105. Altitude module 125 can provide the sensor-based altitude to filtering module 135. Filtering module 135 can combine the GNSS-based altitude value received from GNSS chipset 130 and the sensor-based altitude received from altitude module 125 to determine an overall altitude value. The overall altitude value can be used by navigation system 100 to help ensure that the determination of position and the quality of provided driving directions are optimized. The overall altitude value may also be provided to display 138 such that a user (e.g., vehicle occupant) is able to see the current altitude.

In an exemplary embodiment, filtering module 135 can combine the GNSS-based altitude and the sensor-based altitude value using an iterative filtering process in which noise characteristics of each of the altitude values are taken into consideration. Filtering module 135 can include a Kalman filter for implementing the filtering process. A detailed description of the filtering process is provided in U.S. Patent Application No. 60/942,920 (filed Jun. 8, 2007), the disclosure of which is incorporated herein by reference in its entirety.

Figure 2:
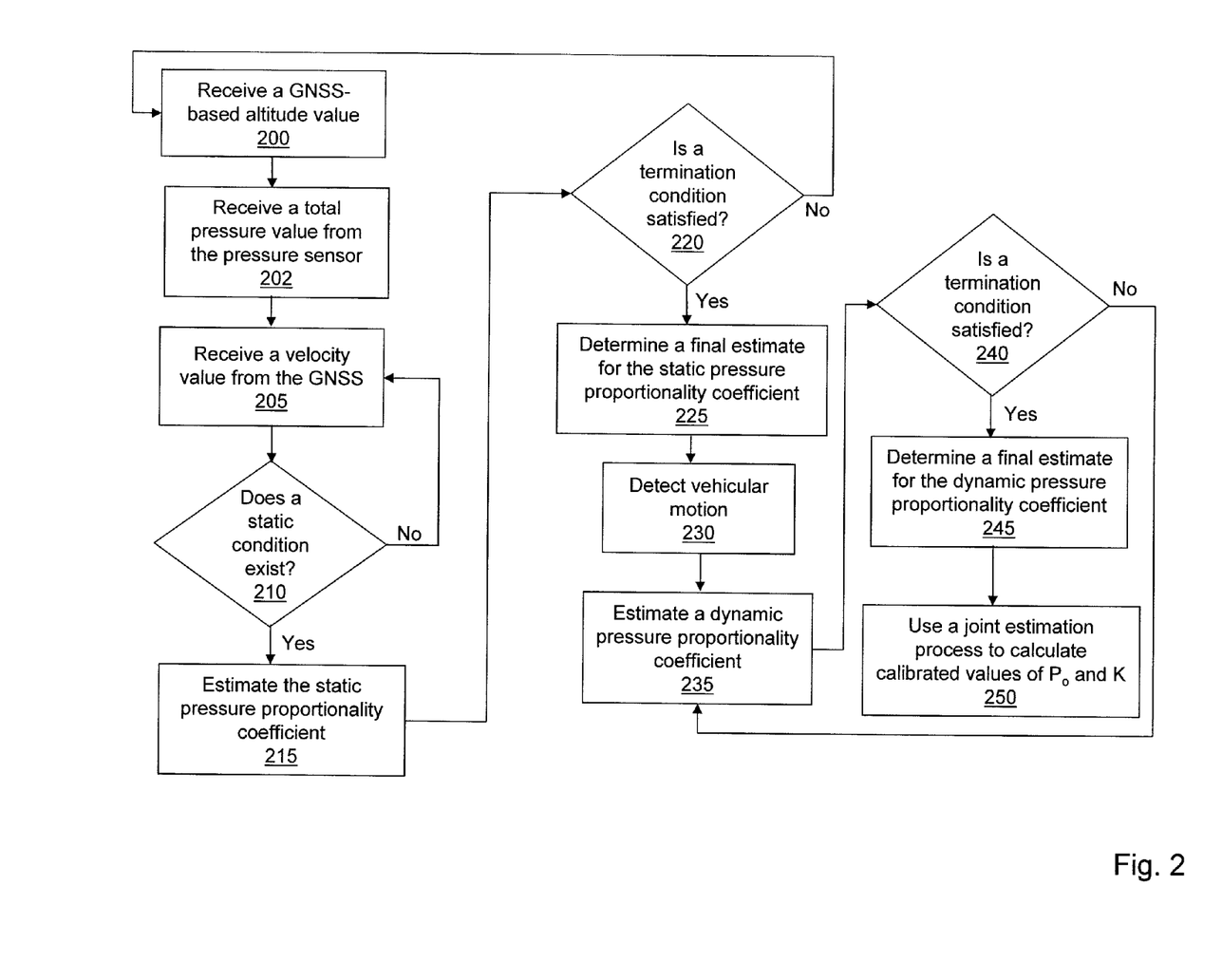
FIG. 2 is a flow diagram illustrating operations performed by a calibration module in accordance with a first exemplary embodiment.

FIG. 2 is a flow diagram illustrating operations performed by calibration module 110 in accordance with a first exemplary embodiment. In alternative embodiments, fewer, additional, or different operations may be performed. In an operation 200, a GNSS-based altitude value is received from GNSS chipset 130. GNSS chipset 130 can generate, for example, a GNSS-based altitude using signals received from satellite A 140, satellite B 145, satellite C 150, and satellite D 155. GNSS chipset 130 can generate the GNSS-based altitude using any method(s) known to those of skill in the art. In one embodiment, calibration module 110 may sample the GNSS-based altitude at finite intervals such that a plurality of values are received. In an operation 202, a total (measured) pressure value is received from pressure sensor 105. Calibration module 110 may sample the measured pressure at finite intervals such that a plurality of measurements are received.

In an operation 205, a velocity value is derived from information provided by GNSS chipset 130. Alternatively, the velocity value may be received from dead reckoning system 120, or any other source. The velocity value can correspond, for example, to a current velocity (in meters per second (m/s)) of a vehicle in which navigation system 100 is installed or otherwise mounted. In an operation 210, a determination is made regarding whether a static condition exists. In an exemplary embodiment, the static condition can exist if the velocity of the vehicle is approximately 0 m/s. Alternatively, the static condition may exist if the received velocity is below a predetermined velocity threshold (e.g., less than x m/s). If the static condition does not exist, calibration module 110 can continue to receive altitude values, measured pressure values, and velocity values until a determination is made that a static condition exists.

If calibration module 110 determines that a static condition exists, an estimate of the static pressure proportionality coefficient is made in an operation 215. In an exemplary embodiment, Equation 5 can be used to estimate the static pressure proportionality coefficient ($P_o$). During the static condition, velocity is zero (or approximately equal to zero) such that the dynamic pressure is also zero. The GNSS-based altitude value received in operation 200 can be substituted into Equation 5 as ALT, and the measured pressure value can be substituted into Equation 5 as $P_{Total}$. Calibration module 110 can use these values to solve Equation 5 for $P_o$.

In an operation 220, a determination is made regarding whether a termination condition is satisfied. If the termination condition is not satisfied, calibration module 110 can continue to estimate the static pressure proportionality coefficient in operation 215. As such, a plurality of estimates can be made based on a plurality of sampled values of the GNSS-based altitude and the measured pressure from the pressure sensor. For example, a first GNSS-based altitude value and a first measured pressure value received at time $t_1$ may be used to make a first estimate of $P_o$, a second GNSS-based altitude value and a second measured pressure value received at time $t_2$ may be used to make a second estimate of $P_o$, and so on.

In an exemplary embodiment, the termination condition can be a threshold-based decision based on an incremental difference between successive estimates of $P_o$. The threshold may be satisfied if the difference over a predetermined number of estimates is sufficiently small. For example, the threshold may be satisfied if the variance between successive estimates does not exceed a threshold value x over y successive estimates. Alternatively, to account for constant drift, the threshold may be satisfied if an overall difference over y estimates does not exceed a value w. Alternatively, the termination condition may be satisfied upon the completion of a predetermined number of estimates of $P_o$. For example, after z estimates of $P_o$, the termination condition may be satisfied and the final estimate of $P_o$ can be an average of the z estimates. Alternatively, the termination condition may be satisfied after an elapsed time, and all of the $P_o$ estimates made during the elapsed time can be used to determine the final estimate of $P_o$. In one embodiment, the termination condition may automatically become satisfied upon termination of the static condition (i.e., when the vehicle begins to move). The termination condition may also become satisfied upon a loss of data from GNSS chipset 130.

If calibration module 110 determines that the termination condition is satisfied, a final estimate for the static pressure proportionality coefficient is determined in an operation 225. The final estimate can be determined based on an average of a plurality of $P_o$ estimates, based on one or more most recent $P_o$ estimates, and/or based on any other mathematical manipulation of the estimate(s) made in operation 215. In an operation 230, vehicular motion is detected. The vehicular motion can be detected by an examination of the velocity value received from GNSS chipset 130 in operation 205. With the vehicle in motion, the velocity (v) is greater than 0 and dynamic pressure is induced, resulting in a dynamic pressure component to the measured pressure.

In an operation 235, the dynamic proportionality coefficient (K) is estimated. In an exemplary embodiment, Equation 5 can be used to estimate K, where $P_{Total}$ is a measured pressure from pressure sensor 105, velocity (v) is a velocity received from GNSS chipset 130, ALT is a GNSS-based altitude value received from GNSS chipset 130, and $P_o$ is the final estimate for $P_o$ determined in operation 225. Alternatively, values for ALT and v may be received from any other source(s). In an operation 240, a determination is made regarding whether a termination condition is satisfied with respect to the dynamic pressure proportionality coefficient. If the termination condition is not satisfied, calibration module 110 can continue to estimate K in operation 235 such that a plurality of successive K value estimates are made. In one embodiment, the termination condition may be the same as the termination condition described with reference to operation 220. For example, the termination condition may be a threshold-based decision based on an incremental difference between successive estimates of K. Alternatively, the termination condition may be satisfied upon the completion of a predetermined number of estimates of K, or after a predetermined elapsed time. If the termination condition is satisfied, a final estimate for the dynamic pressure proportionality coefficient is determined in an operation 245. The final estimate can be determined based on an average of a plurality of K estimates, based on one or more most recent K estimates, and/or based on any other mathematical manipulation of the estimate(s) made in operation 235.

In an operation 250, a joint estimation method is used to calculate calibrated values of $P_o$ and K. The joint estimation (or correction) method can be an iterative process which uses the final estimates of $P_o$ and K as starting points. As described above, the final estimate of $P_o$ from operation 225 may be used as an initial value for obtaining the final estimate of K in operation 245. The final estimate of K, along with a measured pressure value, a velocity value, and an altitude value at a time $t_1$, can be used to obtain a second estimate of $P_o$. The second estimate of $P_o$, along with a measured pressure value, a velocity value, and an altitude value at a time $t_2$, can be used to obtain a second estimate of K, and so on. This process can continue until a termination condition is satisfied. The termination condition can be based on incremental differences in successively calculated estimates of $P_o$ and/or K, based on overall differences over a number of calculated estimates of $P_o$ and/or K, based on a number of iterations, and/or based on any of the other termination conditions described above. The values of $P_o$ and K which satisfy the termination condition of the joint estimation method can be calibrated values which are used to determine the sensor-based altitude. In an exemplary embodiment, the joint estimation method can be a sequential least squares method. Alternatively, any other method may be used to perform the joint estimation of $P_o$ and K. In another alternative embodiment, a joint estimation process may not be used, and the final estimates of $P_o$ and/or K may be used as the calibrated values for determining the sensor-based altitude. In such an embodiment, the calibrated value for K can be based on a single estimate of $P_o$, and further estimation of $P_o$ and/or K may not be performed.

In an exemplary embodiment, altitude module 125 can use Equation 5 to obtain a value for ALT by using a measured pressure value from pressure sensor 105 as $P_{Total}$, a velocity value from GNSS chipset 130 as v, the calibrated value of K as the dynamic pressure proportionality coefficient, and the calibrated value of $P_o$ as the static pressure proportionality coefficient. The determined value for ALT can be the pressure sensor-based altitude value. This sensor-based altitude value can be provided to filtering module 135 for filtering with a GNSS-based altitude value as described above. Once calibrated, the values of $P_o$ and K can continue to be used until an environmental or other change is detected by detection module 115. Detection module 115 is described in more detail with reference to FIG. 5.

Figure 3:
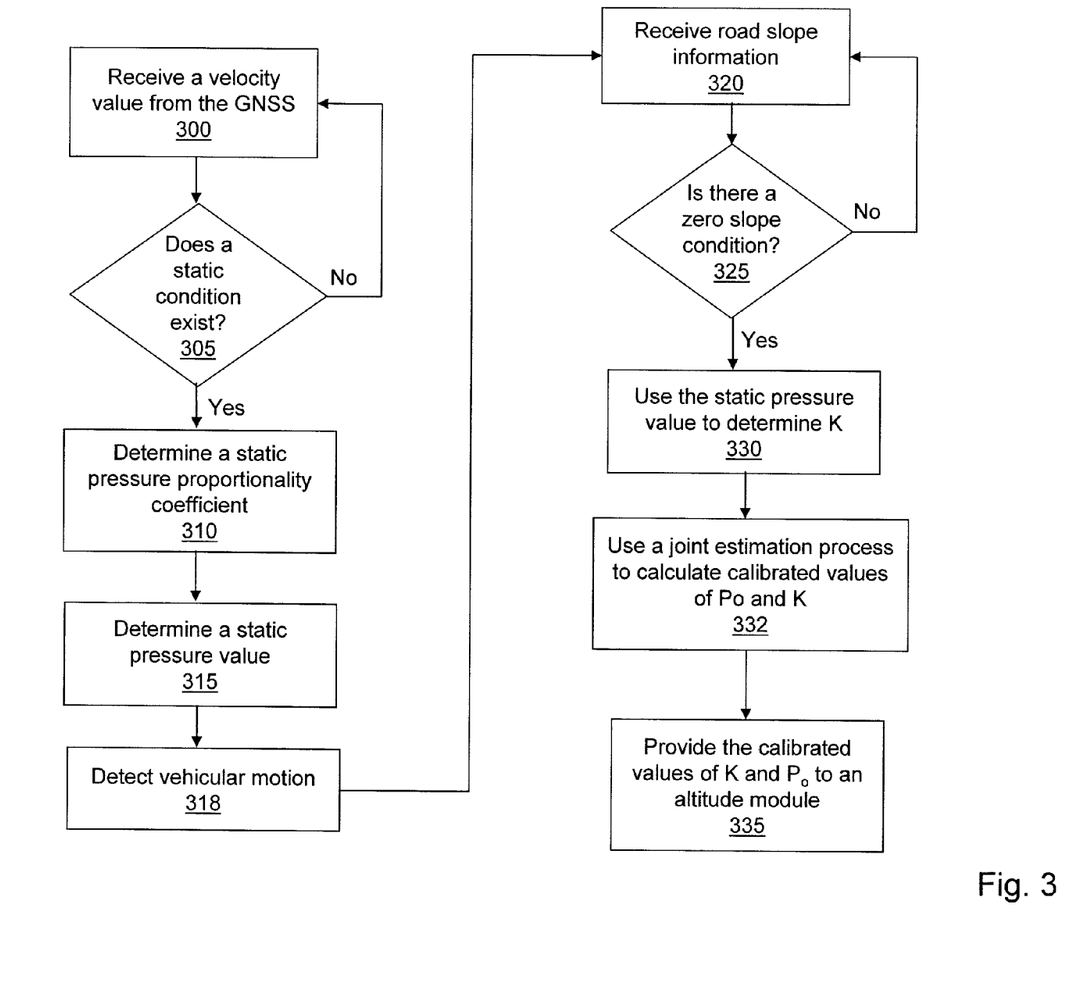
FIG. 3 is a flow diagram illustrating operations performed by a calibration module in accordance with a second exemplary embodiment.

FIG. 3 is a flow diagram illustrating operations performed by calibration module 110 in accordance with a second exemplary embodiment. In alternative embodiments, fewer, additional, or different operations may be performed. In an operation 300, calibration module 110 receives a velocity value from GNSS chipset 130. Alternatively, the velocity value may be received from any other source. In an operation 305, a determination is made regarding whether a static condition exists. The determination can be the same as the static condition determination described with reference to FIG. 2. If a static condition does not exist, calibration module 110 can continue to receive velocity values and monitor for a static condition. If a static condition exists, a static pressure proportionality coefficient $P_o$ is determined in an operation 310. In an exemplary embodiment, $P_o$ can be determined by the same method described with reference to operations 200, 202, 205, 210, 215, and 220 from FIG. 2. Alternatively, any other method(s) may be used to determine $P_o$.

In an operation 315, a static pressure value is determined. In an exemplary embodiment, the static pressure value can be based on one or more pressure measurements received from pressure sensor 105. For example, the static pressure value may be an average of x consecutive pressure sensor measurements, where x is a predetermined value of a termination condition for establishing the static pressure value. Alternatively, a single pressure sensor measurement may be used as the static pressure value. In other alternative embodiments, the static pressure value may be determined by any other manipulation of one or more measured pressure values and/or based on any other termination condition. In an operation 318, calibration module 110 can detect vehicular motion based on a received velocity value.

In an operation 320, calibration module 110 receives road slope information. The road slope information can be for a road upon which the vehicle is traveling, and can include data regarding an expected slope (i.e., change in altitude with respect to change in horizontal distance traveled) of the road. In an exemplary embodiment, the road slope information can be provided by attitude sensor 112. Alternatively, the road slope information can be provided by GNSS chipset 130, dead reckoning system 120, and/or any other source. In an operation 325, a determination is made regarding whether a zero slope condition exists. In an exemplary embodiment, a zero slope condition can exist if the slope of the road upon which the vehicle is traveling is approximately zero. Alternatively, the zero slope condition may exist if the received road slope is less than a predetermined slope threshold. If a zero slope condition does not exist, calibration module 110 can continue to receive road slope information in operation 320.

If a zero slope condition is found to exist and vehicular motion has been detected, calibration module 110 can use the determined static pressure to determine a value for the dynamic pressure proportionality coefficient K in an operation 330. In an exemplary embodiment, the static pressure determined in operation 315 can be assumed to remain substantially stable because of the zero slope condition. However, once the vehicle is moving, the measured pressure value ($P_{Total}$) will change because of the dynamic pressure component which is introduced. As such, it can be assumed that the difference between the determined static pressure and a measured pressure value is equal to the dynamic pressure component of the measured pressure value. This relationship is illustrated below with reference to Equation 6 in which $P_{SP}$ is the determined static pressure and $P_{Total}$ is a measured pressure value obtained during vehicular motion. Once $P_{Dynamic}$ is determined, Equation 4 can be used along with a received velocity value to determine K. In one embodiment, calibration module 110 may ensure that one or more termination conditions are satisfied during the calculation of $P_o$, K, and/or the static pressure value. The one or more termination conditions can be any of the termination conditions described with reference to FIG. 2.

$$P_{Dynamic} = |P_{SP} - P_{Total}| \quad \text{Equation 6}$$

In an operation 332, a joint estimation process is used to calculate calibrated values for $P_o$ and K based on the determined values of $P_o$ and K. The joint estimation process can comprise a least squares method as described with reference to FIG. 2. Alternatively, the joint estimation process may not be used, and the calibrated value of K may be calculated by treating a most recent value of $P_o$ as a known quantity. In an operation 335, the calibrated values of $P_o$ and K are provided to altitude module 125 such that the sensor-based altitude can be determined. Altitude module 125 can use K, $P_o$, a measured pressure value, a received velocity value, and Equation 5 to determine the sensor-based altitude.

Figure 4:
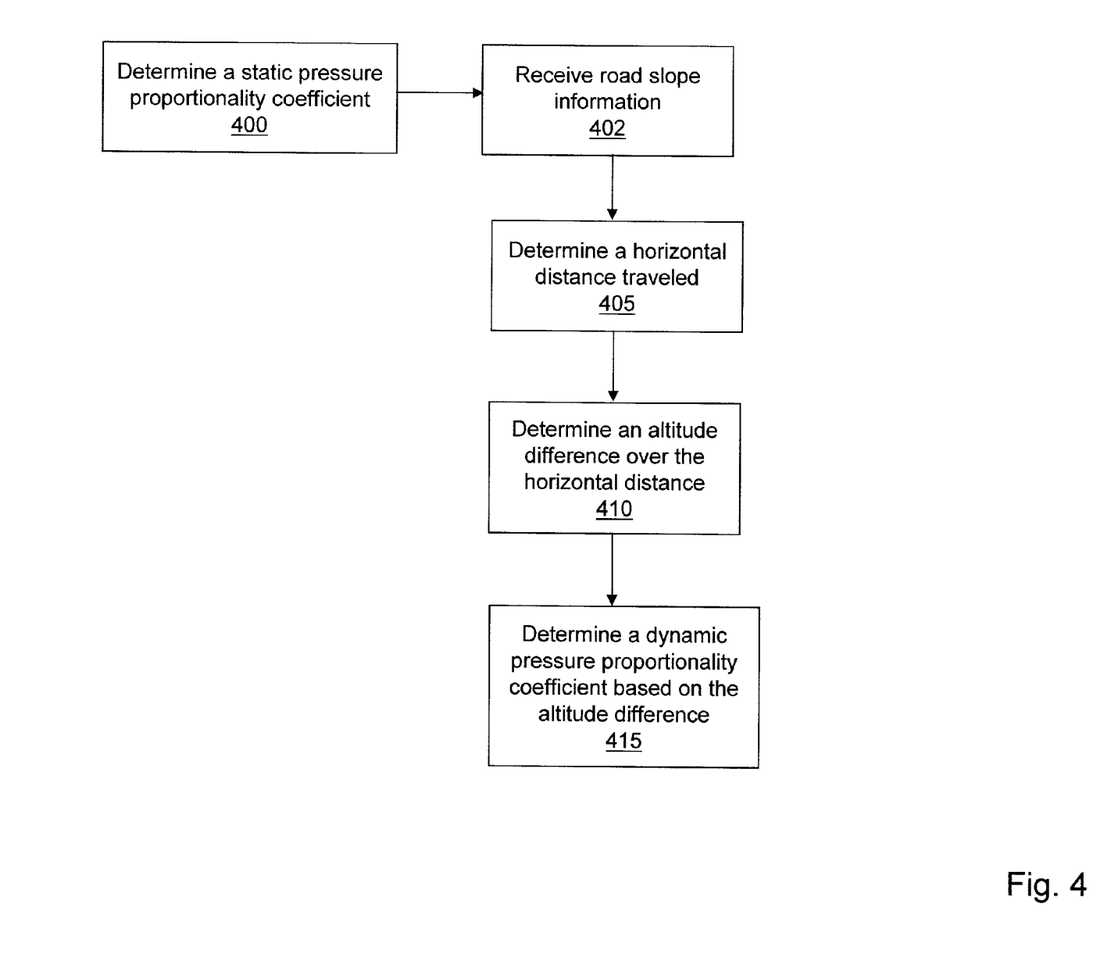
FIG. 4 is a flow diagram illustrating operations performed by a calibration module in accordance with a third exemplary embodiment.

FIG. 4 is a flow diagram illustrating operations performed by calibration module 110 in accordance with a third exemplary embodiment. In an operation 400, a static pressure proportionality coefficient $P_o$ is determined. The value for $P_o$ may be determined using any of the methods described with reference to FIGS. 2 and 3. In an operation 402, road slope information is received. The road slope information can be received from attitude sensor 112, GNSS chipset 130, dead reckoning system 120, and/or any other source. In an operation 405, a horizontal distance traveled over an elapsed time is determined. The horizontal distance traveled can be obtained using latitude and longitude coordinates provided by GNSS chipset 130. Alternatively, the horizontal distance traveled may be determined by multiplying a velocity value by an elapsed time. The velocity value can be provided by GNSS chipset 130, dead reckoning system 120, and/or any other source. The elapsed time can be a length of time between sampling points at which pressure measurements are taken with pressure sensor 105.

In an operation 410, an altitude difference over the horizontal distance traveled is determined. In an exemplary embodiment, the altitude difference can be determined by multiplying the horizontal distance and the slope. In an alternative embodiment, the altitude difference can be determined by using GNSS-based altitude values provided by GNSS chipset 130. For example, the elapsed time between pressure sensor measurements can have a start time and an end time. GNSS chipset 130 can provide a first GNSS-based altitude value at the start time and a second GNSS-based altitude value at the end time, and the difference between the first and second GNSS-based altitude values can be the altitude difference. Using the altitude difference as opposed to a single GNSS-based altitude value can help to cancel out any bias in the GNSS-based altitude values.

In an operation 415, a dynamic pressure proportionality coefficient (K) is determined based on the altitude difference. In an exemplary embodiment, Equation 5 can be algebraically manipulated to express K as a function of the altitude difference as illustrated in Equations 7-10 below. Once expressed as a function of the altitude difference, K can be solved for using standard mathematical techniques. In an exemplary embodiment, a MacLaurin series expansion may be used for the natural log and exponential terms to express K as a function of altitude difference. Using Equation 5, the altitude (ALT) can be expressed as illustrated with reference to Equation 7 below. Using a MacLaurin series expansion (with higher order terms ignored) and the assumption that $K*v^2$ is much less than $P_{Total}$, the expression $(P_{Total}-K*v^2)^{-1/\alpha}$ can be approximately represented by the expression illustrated with reference to Equation 8 below.

$$ALT = \frac{T_o}{T_{grad}} \left[ \frac{(P_{Total} - K*v^2)^{(\frac{-1}{\alpha})}}{P_o^{(\frac{-1}{\alpha})}} - 1 \right] \quad \text{Equation 7}$$

$$(P_{Total} - K*v^2)^{(\frac{-1}{\alpha})} \approx P_{Total}^{(\frac{-1}{\alpha})} * e^{(\frac{1}{\alpha})*\left(\frac{K*v^2}{P_{Total}}\right)} \quad \text{Equation 8}$$

By substituting the expression from Equation 8 into Equation 7 and using a MacLaurin series expansion (with higher order terms ignored), the altitude (ALT) can be represented by the expression illustrated with reference to Equation 9. The dynamic stress proportionality coefficient K can be represented in terms of an altitude difference by differencing the expression of Equation 9 and solving for K. An expression representing K is illustrated with reference to Equation 10, in which $ALT_1$ is an altitude at a time $t_1$, $ALT_2$ is an altitude at a time $t_2$, $P_1$ is a measured pressure at $t_1$, $P_2$ is a measured pressure at $t_2$, $v_1$ is a velocity at $t_1$, and $v_2$ is a velocity at $t_2$.

$$ALT = \frac{T_o}{T_{grad}}\left[\left(\frac{P_{Total}}{P_o}\right)^{(\frac{-1}{\alpha})} - 1\right] - \qquad \text{Equation 9}$$

$$\left(\frac{T_o}{T_{grad}}\right)*\left(\frac{P_{Total}}{P_o}\right)^{(\frac{-1}{\alpha})}*\left(\frac{\left(\frac{-1}{\alpha}\right)*K*v^2}{P_{Total}}\right)$$

$$K = \frac{\frac{T_o}{T_{grad}}*\left[\left(\frac{P_2}{P_o}\right)^{\frac{-1}{\alpha}} - \left(\frac{P_1}{P_o}\right)^{\frac{-1}{\alpha}}\right] - (ALT_2 - ALT_1)}{\left(\frac{-1}{\alpha}\right)*\left(\frac{T_o}{T_{grad}}\right)*\left(\frac{P_2}{P_o}\right)^{(\frac{-1}{\alpha})}*\left(\frac{v_2^2}{P_2}\right) - \left(\frac{-1}{\alpha}\right)*\left(\frac{T_o}{T_{grad}}\right)*\left(\frac{P_1}{P_o}\right)^{(\frac{-1}{\alpha})}*\left(\frac{v_1^2}{P_1}\right)} \qquad \text{Equation 10}$$

By expressing K as a function of the altitude difference, K has a low degree of dependency on $P_o$. As such, $P_o$ can be estimated during a static condition as described with reference to FIGS. 2 and 3, and used in the determination of K. Alternatively, a rough estimate of $P_o$ can be used in the determination of K and improved upon using a joint estimation procedure once an accurate value of K is available. Alternatively, the rough estimate or estimated value of $P_o$ may be treated as a known quantity, and the joint estimation procedure may not be used. In one embodiment, a Taylor series linearization can be used to solve for K as a function of the altitude difference. An initial reference value for K can be used such that K can be iteratively estimated using the Taylor series linearization. The initial reference value can be obtained using any of the methods described with reference to FIGS. 2 and 3. Alternatively, any other method(s) may be used to solve for K. In one embodiment, the value of $P_o$ determined in operation 400 and the value of K determined in operation 415 can be used as inputs to a joint estimation method for calculating calibrated values of $P_o$ and K. Alternatively, the value of $P_o$ determined in operation 400 and the value of K determined in operation 415 may be used as calibrated values, and the joint estimation procedure may not be used. The calibrated values of $P_o$ and K can be used to calculate the sensor-based altitude as described above with reference to FIGS. 2 and 3.

The actual values of $P_o$ and K can change rapidly due to changes in the weather, the opening of a vehicle window, an air conditioner being turned on or off, etc. If previously calibrated values for $P_o$ and K continue to be used after such an environmental change, there may be a large discrepancy between the actual and calibrated values, resulting in an unreliable sensor-based altitude. As such, it is desirable to rapidly detect changes to $P_o$ and/or K so that pressure sensor 105 can be recalibrated. If a change in $P_o$ and/or K occurs during the calibration stage, the termination conditions described with reference to FIGS. 2-4 can be used extend the calibration procedure until the estimates of $P_o$ and K become substantially stable.

As an example, a termination condition for a joint estimation procedure may become satisfied if a difference between consecutive estimates of K varies by less than x for at least 100 successive estimates of K, and if a difference between consecutive estimates of $P_o$ varies by less than y for at least 100 successive estimates of $P_o$, where y may be greater than, equal to, or less than x. After 50 estimates of K, all of which satisfy the condition x, an environmental change may occur and cause a substantial change in K. As a result, the $51^{st}$ estimate of K may not satisfy the condition x, and the termination condition can be reset. The process can continue until the termination condition (e.g., less than x variance for 100 consecutive estimates) is met. Alternatively, the termination condition may be satisfied if the overall difference between a $1^{st}$ estimate of K (or $P_o$) and a $100^{th}$ estimate of K (or $P_o$) is less than a value z. In another alternative embodiment, the termination condition may be satisfied if both the condition x and the condition z are satisfied for K and/or $P_o$. Other termination conditions may also be used to ensure that environmental changes which occur during calibration are accounted for.

Figure 5:
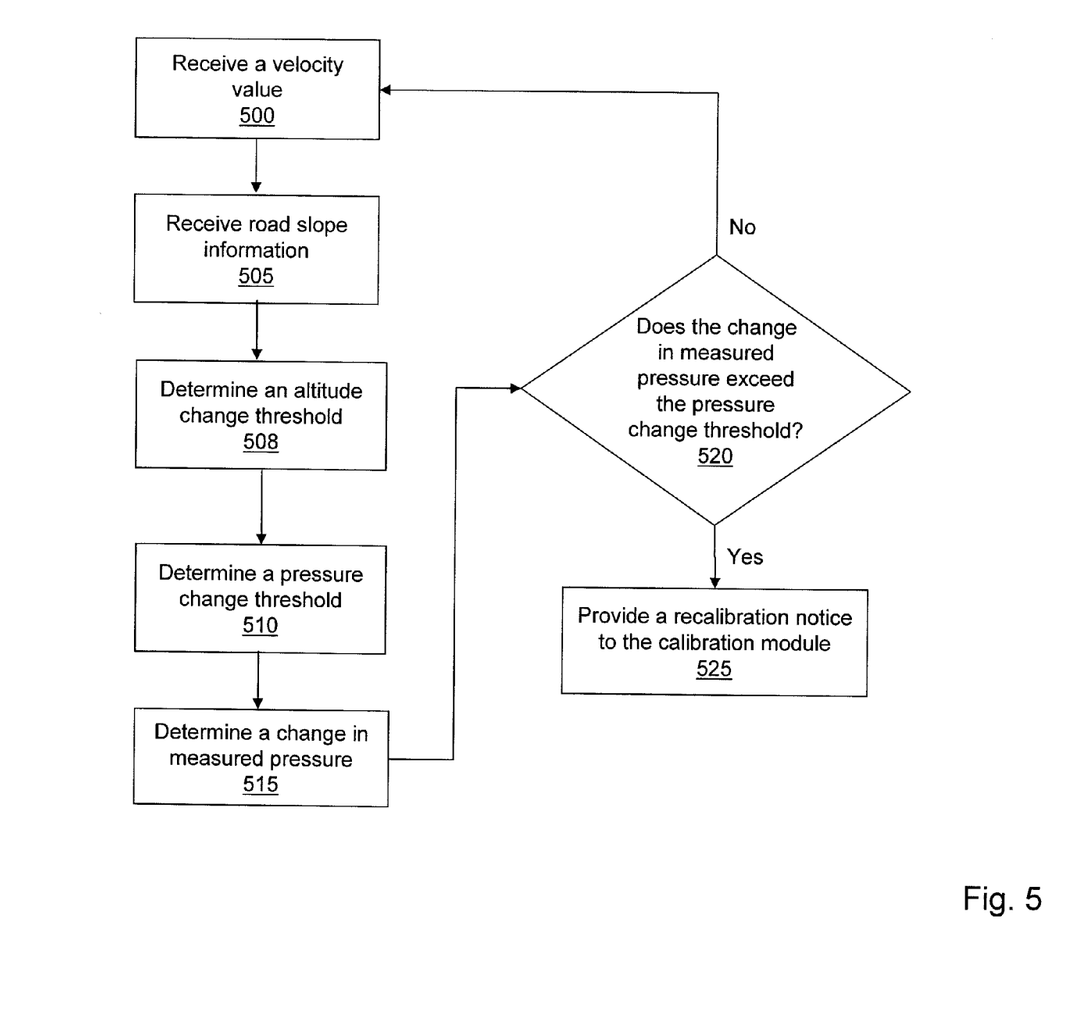
FIG. 5 is a flow diagram illustrating operations performed by a detection module in accordance with an exemplary embodiment.

In an exemplary embodiment, detection module 115 illustrated with reference to FIG. 1 can be used to detect changes in $P_o$ and K after pressure sensor 105 has been calibrated. FIG. 5 is a flow diagram illustrating operations performed by detection module 115 in accordance with an exemplary embodiment. In alternative embodiments, fewer, additional, or different operations may be performed. In an operation 500, a velocity value is received. The velocity value may be received from GNSS chipset 130, dead reckoning system 120, or any other source. In an operation 505, road slope information is received. The road slope information may be received from dead reckoning system 120, attitude sensor 112, or any other source. Alternatively, the road slope information may be calculated by extrapolation based on a difference between a first GNSS-based altitude value and a second GNSS-based altitude value.

In an operation 508, an altitude change threshold is determined by detection module 115. The altitude change threshold can be a maximum expected change in altitude over a time interval based on the received velocity value and the received road slope information. For example, the road slope information may indicate a road slope of 12%, the velocity value (v) may be 30 m/s, and the time interval may be one second. Assuming that values of K, $P_o$, and v remain constant over the time interval, a maximum expected change in altitude can be 3.6 m (distance traveled multiplied by slope). Alternatively, a first velocity value and a second velocity value may be averaged or otherwise mathematically manipulated to determine the distance traveled.

In an operation 510, a pressure change threshold is determined by detection module 115. In an exemplary embodiment, the pressure change threshold can be based on a maximum expected change in pressure over a time interval based on the altitude change threshold. For example, if the altitude change threshold is 3.6 m, and assuming that K and $P_o$ remain constant over the time interval, Equation 5 can be used to determine that the maximum expected change in pressure over a one second time interval is approximately 40 Pascals (Pa). The pressure change threshold can be based on a percentage of the maximum expected change in pressure. For example, if the maximum expected change in pressure is 40 Pa, a percentage of 5% can result in a pressure change threshold of approximately 48 Pa. Alternatively, the pressure change threshold can be a range of pressure values.

In an operation 515, a change in measured pressure is determined. The change in measured pressure can be identified by taking the difference of a first measured pressure value and a second measured pressure value, where the measured pressure values are provided by pressure sensor 105. The first measured pressure value can be taken at a start of the time interval over which the pressure change threshold is based, and the second measured pressure value can be taken at an end of the time interval. In an operation 520, a decision is made regarding whether the determined change in measured pressure exceeds the pressure change threshold. If the pressure change threshold is not exceeded, detection module 115 can continue to re-execute the detection process by determining a pressure change threshold over a second time interval, determining a change in measured pressure over the second time interval, determining whether the pressure change threshold is exceeded, and so on.

If the pressure change threshold is exceeded, detection module 115 can determine that the change in measured pressure is due to a change in $P_o$ and/or K. In an operation 525, detection module 115 provides a recalibration notice to calibration module 110 such that pressure sensor 105 can be recalibrated. As an example, a vehicle may be traveling, with windows closed, at a constant velocity of 30 m/s on a road with a known slope of 12%. A calibrated value for K can be −0.06, resulting in a dynamic pressure component of 54 Pa and a corresponding dynamic pressure-based altitude error of 5 m. Detection module 115 can determine that a pressure change threshold is approximately 40 Pa. Upon opening of a window in the vehicle, K may change to −0.20, resulting in a dynamic pressure component of 180 Pa. Assuming the change in K occurred substantially within a time interval over which the pressure change threshold is based, the change in measured pressure may be up to 126 Pa. Detection module 115 can determine that the change in measured pressure (126 Pa) exceeds the pressure change threshold (40 Pa) and cause recalibration of pressure sensor 105. Pressure sensor 105 can be recalibrated such that K is approximately −0.20, resulting in an optimized sensor-based altitude value.

As illustrated with reference to Equation 4, the dynamic pressure component is directly related to the square of the velocity. It follows that the dynamic pressure component is relatively high at higher velocities and relatively low at lower velocities. As such, changes in K which occur at lower velocities may have little impact on the resulting sensor-based altitude value. For example, at a velocity of 10 m/s, opening of a window may result in a change in measured pressure of 14 Pa and a corresponding dynamic pressure-based altitude error of less than 2 m. If the change in measured pressure occurs over several time intervals, the pressure change threshold may not be exceeded. However, this non-detection may be tolerated because of the small altitude error. Alternatively, the pressure change threshold and/or the time interval can be adjusted to account for changes which occur at low velocity.

In one embodiment, detection module 115 may also identify variation in velocity and monitor changes in measured pressure over a time interval with at least a predetermined amount of velocity variation. Detection of velocity variation can be used to account for environmental changes which occur at low velocity and/or during acceleration. As an example, calibration module may calculate a calibrated value of −0.06 for K while the windows of the vehicle are closed. While at a stop sign (i.e., zero velocity), a user may open a window. There will be no immediate change in dynamic pressure because of the zero velocity. However, K will change as the vehicle accelerates due to the open window condition. The vehicle may accelerate from 0 m/s to 30 m/s at a rate of 1 m/s/s. If the road upon which the vehicle is traveling has constant altitude, the change in measured pressure from one second to the next can be based primarily on the change in dynamic pressure. However, over one second time intervals, the change in dynamic pressure may not exceed approximately 12 Pa and the pressure change threshold may not be exceeded. However, as described above, the overall change in dynamic pressure can be approximately 126 Pa by the time the vehicle reaches 30 m/s. Because the pressure change threshold was not exceeded, the pressure sensor may not be recalibrated. This can result in an inaccurate sensor-based altitude value. By monitoring velocity variation and/or changes in measured pressure over a velocity variation, detection module 115 can detect changes in K and ensure that pressure sensor 105 is recalibrated. In one embodiment, detection module 115 can use a longer time interval (i.e., 2, 3, 4, etc.) for determining the pressure change threshold in instances where velocity variation is detected.

Signal deflection, poor weather, natural obstructions, time of day, etc. are all factors which can affect the receipt of GNSS signals. As such, GNSS chipset 130 may periodically lose reception and be unable to provide any information to navigation system 100. If such a loss of reception occurs during calibration, calibration module 105 may relax one or more termination conditions to obtain values for K and/or $P_o$. If the loss of reception occurs after calibrated values for K and $P_o$ have been calculated, the sensor-based altitude may be extrapolated based on previously filtered altitude values. Alternatively, dead reckoning system 120 may be used to provide velocity and/or altitude estimates such that the sensor-based altitude can be calculated. However, as time passes, the likelihood of an inaccurate sensor-based altitude increases as time passes without any data from GNSS chipset 130. As such, in an exemplary embodiment, altitude may continue to be provided for only a predetermined limited amount of time after a loss of data from GNSS chipset 130.

The system has been described herein primarily with reference to a navigation system for use in a vehicle. It is to be understood that the exemplary embodiments are not limited to vehicle-based navigations systems. The exemplary embodiments may also be applied to any other type of positioning systems such as standalone GPS/GNSS systems of the type which are commonly used for recreational purposes.

One or more flow diagrams have been used to describe exemplary embodiments. The use of flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A navigation system comprising:
    a pressure sensor;
    a calibration module configured to be in communication with the pressure sensor and configured to determine dynamic pressure model information based at least in part on at least three parameters, the at least three parameters including:
        static pressure model information,
        a measured pressure value from the pressure sensor, and
        a velocity value of the navigation system;
    an altitude module in communication with the calibration module and configured to calculate a sensor-based altitude value based at least in part on the determined dynamic pressure model information; and
    a global navigation satellite system chipset configured to provide a received altitude value to the calibration module;
    wherein the calibration module is further configured to determine a static pressure proportionality coefficient based at least in part on:
        a received altitude value; and a second measured pressure value from the pressure sensor.

2. The navigation system of claim 1, wherein the static pressure proportionality coefficient is determined during a static condition.

3. The navigation system of claim 1, further comprising a filtering module configured to:
receive the sensor-based altitude value from the calibration module; and
receive a global navigation satellite system (GNSS)-based altitude value from the global navigation satellite system chipset; and
combine the sensor-based altitude value and the GNSS-based altitude value to create an overall altitude value, wherein the overall altitude value is based at least in part on a noise characteristic of the GNSS-based altitude value.

4. The navigation system of claim 1, wherein the velocity value is received from at least one of the global navigation satellite system chipset or a dead reckoning system.

5. The navigation system of claim 1, further comprising a detection module configured to identify a change in the dynamic pressure proportionality coefficient.

* * * * *